United States Patent
Todeschini et al.

(10) Patent No.: US 9,262,633 B1
(45) Date of Patent: Feb. 16, 2016

(54) BARCODE READER WITH SECURITY FEATURES

(71) Applicant: Hand Held Products, Inc., Fort Mill, SC (US)

(72) Inventors: Erik Todeschini, Camillus, NY (US); Timothy Meier, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 14/529,857

(22) Filed: Oct. 31, 2014

(51) Int. Cl.
*G06K 7/10* (2006.01)
*G06F 21/56* (2013.01)

(52) U.S. Cl.
CPC .............. *G06F 21/56* (2013.01); *G06F 21/564* (2013.01); *G06F 21/568* (2013.01); *G06K 7/10821* (2013.01); *G06F 2221/03* (2013.01)

(58) Field of Classification Search
CPC ... G06K 7/14; G06K 7/10851; G06K 7/0166; G06K 17/00; G06K 7/10693
USPC .............. 235/462.25, 462.01, 462.07, 462.13
See application file for complete search history.

(56) References Cited

U.S. PATENT DOCUMENTS

2014/0283118 A1*  9/2014  Anderson ............... G06F 21/51
726/27

* cited by examiner

*Primary Examiner* — Karl D Frech
(74) *Attorney, Agent, or Firm* — Additon, Higgins & Pendleton, P.A.

(57) ABSTRACT

Indicia may include security threats that, when scanned by a barcode reader, may cause unwanted actions to be performed by a host device communicatively coupled to the barcode reader. To prevent these security threats from affecting the host device, security software running on a processor in the barcode reader or the host device compares the scanned data with items in a threat-signature library. Scanned data that match, at least part of, the threat signature library are blocked from being transmitted to the host device.

21 Claims, 4 Drawing Sheets

BARCODE READER WITH SECURITY FEATURES

FIELD OF THE INVENTION

The present invention relates to barcode readers, and more specifically to a barcode reader configured for security against unwanted and/or malicious indicia.

BACKGROUND

Cyber security is an important concern for all computing devices, and managing the access to a computing device may help eliminate security breaches. Barcode readers typically have direct access to their host computing devices (i.e., host device). This access has traditionally allowed the barcode scanner to transmit large amounts of decoded data from printed indicia (e.g., barcodes) to the host device as a fast and convenient means for data entry. In recent years, indicia have become more sophisticated. Modern indicia may encode information for more than just data entry. For example, computing devices may allow information from a decoded indicium to alter data or start/end/alter a process running on the host device. This added functionality has created a security vulnerability.

Indicia are inscrutable without a barcode reader and are anonymous, having no links to their creator. These characteristics combined with a barcode reader's intimate access to the host device provide an opportunity for misuse. For example, an indicia encoded with malicious information could hijack a host device and cause unwanted actions, damage, or loss. If the host device is a part of a larger system (i.e., network of computers) then this risk becomes even more pernicious.

A need, therefore, exists for a barcode reader with security features to screen decoded indicia information (i.e., decoded data) and prevent threatening and/or risky information from being exposed to a host device and/or host system.

SUMMARY

Accordingly, in one aspect, the present invention embraces a barcode reader. The barcode reader includes a barcode sensor for capturing barcode information, a memory for storing a security program, and a processor. The processor is communicatively coupled to the barcode sensor and the memory. The processor is configured by the security program to receive the barcode information and convert the barcode information into decoded data. The program further configures the processor to compare the decoded data with a threat-signature library stored in the memory. If the decoded data matches, at least part of, an item in the threat-signature library then the processor identifies the decoded data as a threat.

In an exemplary embodiment, the processor is configured by the security program to prevent the threat from being transmitted from the barcode reader. In some embodiments, the threat is deleted from the memory, while in others it is stored in the memory (i.e., quarantined).

In another exemplary embodiment, the barcode sensor includes a laser scanner for scanning a laser across a field of view, while in another embodiment the barcode sensor includes an imaging system for capturing images of a field of view.

In another exemplary embodiment, the barcode reader includes an input/output (IO) module (e.g., user interface) for transmitting/receiving information to/from a user. The IO module may be used in some embodiments to generate an alert when a threat has been detected. In possible embodiments, this alert may be an audible sound, a visual indication, and/or a prompt requiring a user to accept or reject the threat.

In another embodiment, the threat-signature library includes items having information that could cause a buffer overflow or could cause code injection.

In another aspect, the present invention embraces an indicia-reading system. The indicia-reading system includes a barcode reader for reading indicia and transmitting decoded data. The indicia-reading system also includes a host device communicatively coupled to the barcode reader via a data link. The host device has at least one processor configured by an interface-software program to block decoded data that meet one or more threat criteria stored on a computer-readable medium communicatively coupled to the host device and accessible to the interface-software program. In this way, the interface-software program prevents the decoded data from affecting other system and/or application software programs running on the host device.

In another aspect, the present invention embraces a method for blocking the transmission of threats from a barcode reader. The method includes scanning a barcode to obtain a scanned-barcode signal. The scanned-barcode signal is converted into decoded data that is compared with items in a threat-signature library. If the decoded data matches, at least part of, an item in the threat-signature library, then it is identified as a threat and its transmission from the barcode scanner is blocked.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
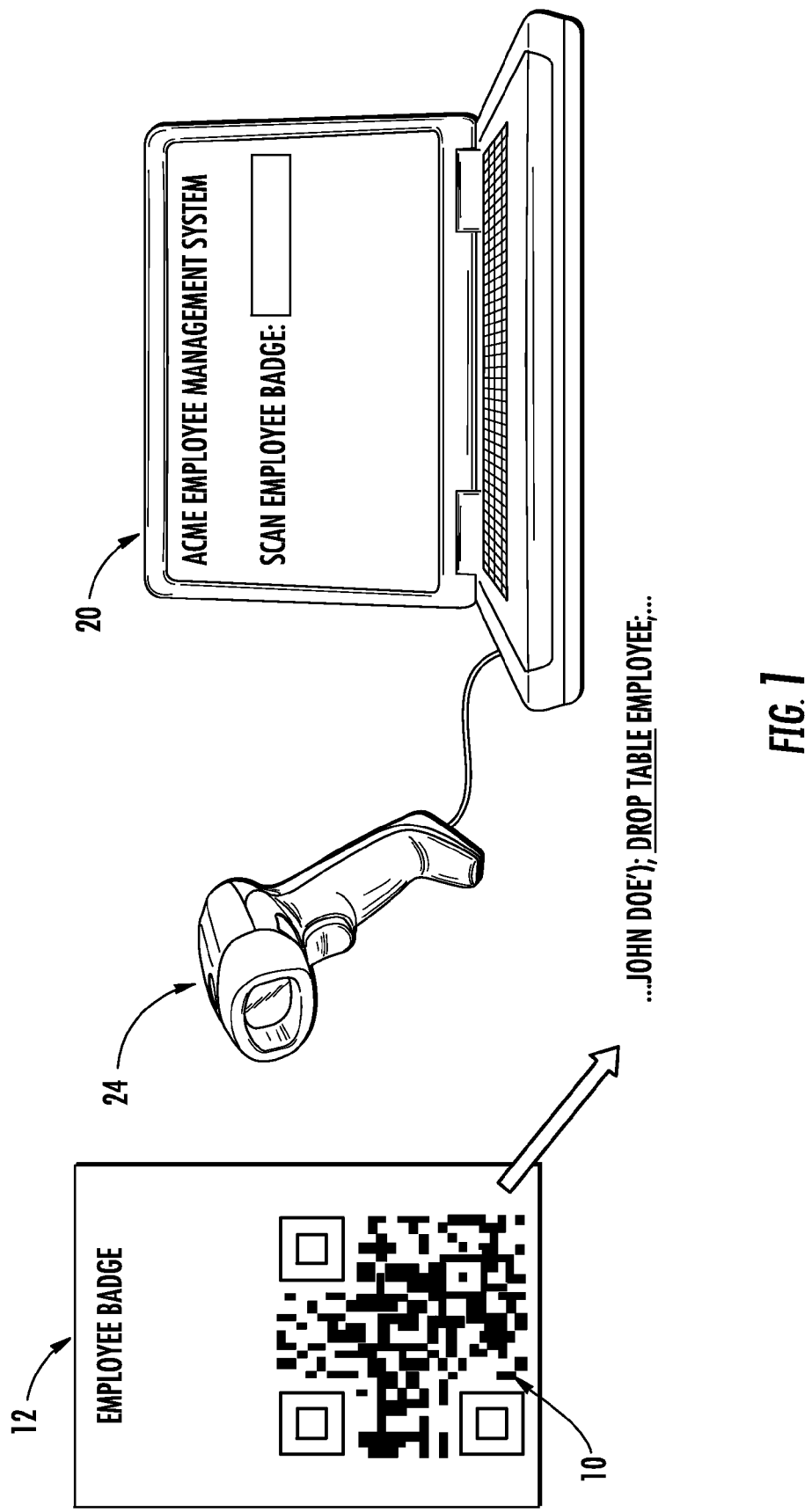
FIG. 1 graphically depicts an indicia-reading system and a malicious barcode.

As our society has become more dependent on computer systems, cyber security has become an important issue. An indicia reader (i.e., barcode reader, barcode scanner, etc.) has direct access to a host device (i.e., host computer, computer, etc.) since its primary purpose is to input data from an encoded barcode into an application running on the host device. This direct access may be exploited to gain access to the host device and/or alter data and/or processes on the host device.

Data encoded into an indicium (e.g., barcodes) may be scanned (i.e., read) by a barcode reader and transmitted directly to a host device. The host device typically accepts and processes the data without question. A vulnerability exists in this approach. Without proper security features, malicious data encoded into a barcode could cause unwanted results and/or unwanted behavior in the host device. Executable scripts, for example, could alter the way a program running on the host device operates. The altered program could cause erratic behavior, incorrect results, a system crash, or a security breach. The invention described herein addresses this problem via security features to detect threat data from a barcode and prevent this data from taking action on the host device.

Indicia are optical representations of data. There are many types of indicia for many applications. Indicia may be one-dimensional barcodes (e.g., Universal Product Code, UPC) having dark lines (i.e., bars) and light lines (i.e., spaces) of various widths arranged along a scan axis. Indicia may be two-dimensional matrix symbols (e.g., Aztec Code, Data Matrix, QR code, etc.) having a two dimensional array of light features, dark features, and (in some cases) alignment features. Some indicia may use color (e.g., HCCB) to encode data. Indicia are typically printed and affixed to an item. Often, the encoded information relates to the item on which the indicia is affixed. Electronically displayed indicia may replace printed indicia in some applications, especially in applications run on a smartphone with a display.

Indicia provide a convenient means to (i) transmit a large amount of information (i.e., data) to a host device or (ii) enable a process (e.g., launch a website) on the host device. The encoded information stored in the indicia maps to the indicia pattern through a symbology that specifies such things such as encoding patterns, start/stop patterns, quiet zones, checksums, and error correction. Symbologies are often freely available, and a user may easily create a barcode encoded with custom information for a particular application. For example, websites and/or contact information may be easily loaded into smartphone via a barcode.

Indicia have characteristics that make them attractive to hackers. The data stored in an indicium is inscrutable to a user without a scanner. There is no way to know what indicia may pose a threat before scanning. In addition, communication through indicia is anonymous. A printed indicium may have nothing to link it with the author. An individual can spread malicious code with little risk of identification.

Malicious attacks using indicia (i.e., barcodes) may take many forms. One form is code injection. Code injection is used to attack data-driven applications where malicious code (e.g., SQL statement) is inserted into a data entry field to cause some unwanted action. FIG. 1 illustrates a code injection threat. Here an indicium in the form of a QR-code 10 is used to transmit data and code instructions. The malicious QR-code 10 instructs the application (i.e., ACME Employee Management System) running on the host device 20 to delete a database of employees (i.e., DROP TABLE) when the employee's badge 12 is scanned with a barcode reader 24. Code injection attacks include (but are not limited to) SQL injection, html-script injection, Java-script injection, and ASP injection.

Other attacks, such as buffer overflow attacks, attempt to overwhelm a host device's memory (i.e., buffer) so data stored adjacent to the buffer is overwritten or so that data regarding the memory's organization is corrupted. This attack could result in the hacker taking over some memory in order to inject data and/or code. This data and/or code may then disable or hijack the host device.

Still other potential attacks use mobile code. Mobile code (e.g., Macros) is software transferred to a host device and executed without explicit installation by the recipient. This code can be encapsulated or embedded in the files transferred to the host device. The potential attacks using barcodes are numerous and varied. Other potential attacks include (but are not limited to) dynamic-evaluation vulnerabilities, include-file injections, and shell injections.

Applications running on a host device that utilize barcodes for input are vulnerable to the attacks described. The risk of damage from these attacks is high. Security features run locally on a barcode reader or an interface-software program run on the host computer may detect malicious indicia (i.e., barcodes) before they harm the host device. To accomplish this, the decoded data may be inspected for malicious attack patterns (i.e., threat signatures).

Threat signatures are typically stored on a computer-readable memory as part of a threat-signature library. Code-injection signatures, for example, might include key words and/or syntax. A SQL Injection attack might contain SQL specific keywords like "DROP TABLE" or "SELECT. Buffer overflows could be identified by attempts to exceed data storage limits and could be prevented by a restriction on input data to ensure that the buffer's memory allocation is not exceeded. In addition, templates may be part of the threat-signature library. These templates could restrict decoded data to certain formats and ensure that data output from the barcode scanner stays within the format the connected system is expecting. The threat-signature library may be updated from time to time to address new or changing threats.

If the decoded data matched at least part of an item in the threat-signature library (e.g., code injection key word) or meets some other threat criterion (e.g., does not match a stored template), then the data could be labeled as a threat and a responsive action could be taken. This responsive action might include the deletion of the threat, the storage of the threat (e.g., quarantine), or the prompting of a user to decide the fate of the threat.

An input/output (I/O) module integrated with the barcode reader could generate an alert when a threat is detected. This alert could be displayed via the I/O module as an audible sound, a visual indication, or a prompt requesting a user action (e.g., accept or reject the threat).

Figure 2:
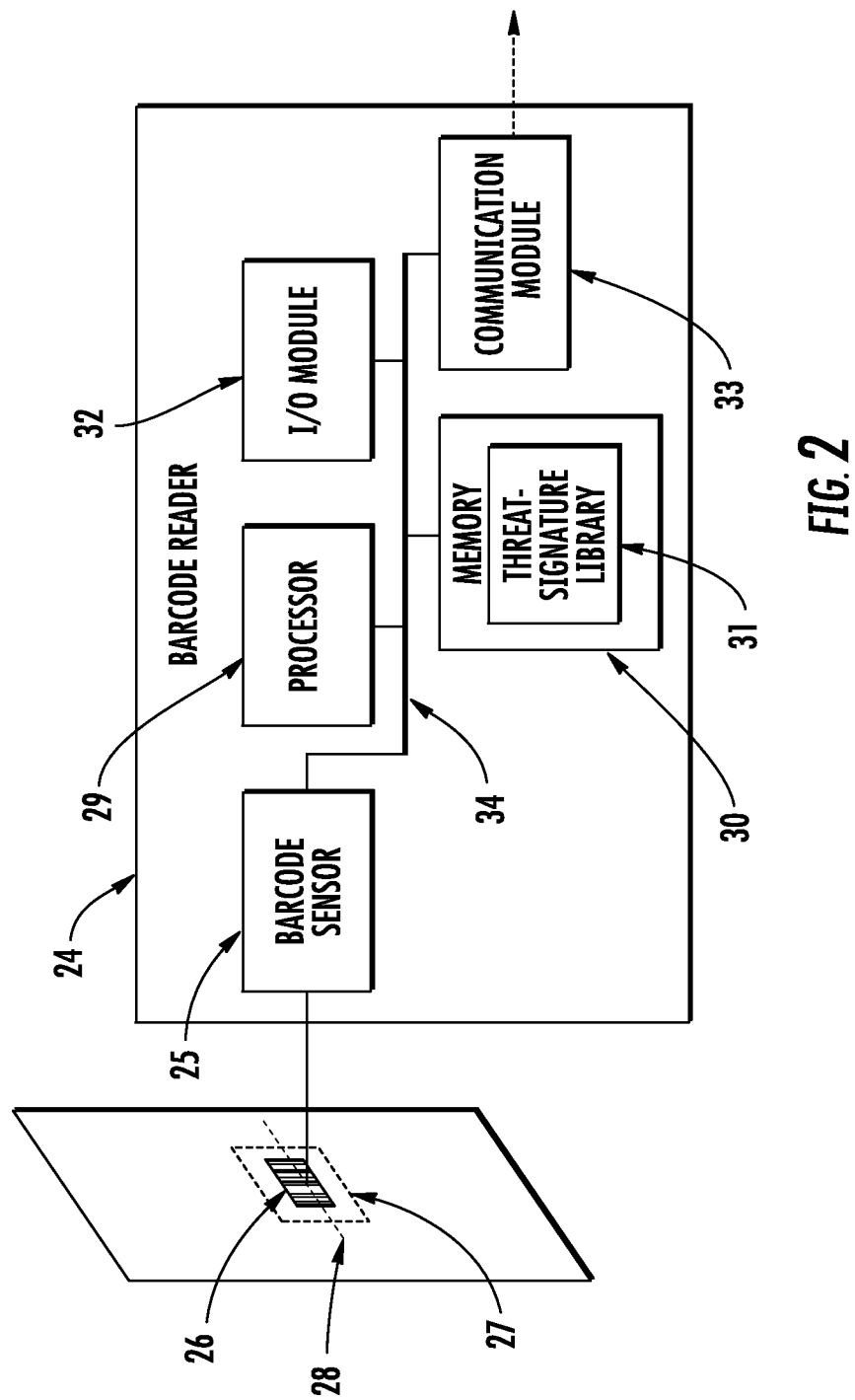
FIG. 2 schematically depicts a block diagram of an exemplary barcode reader including security features.

FIG. 2 illustrates a possible embodiment of a barcode reader 24 with security features. The barcode reader 24 includes a barcode sensor 25 for gathering scanning (i.e., reading) a barcode 26. The barcode sensor 25 may use a variety of techniques to read the barcode 26.

In one possible embodiment, the barcode sensor 25 includes a laser scanner for scanning a laser across a field of view 27. Here a collimated beam of laser light is swept back and forth along a scan-line 28 aligned with the barcode 26. As the light beam encounters the light and dark areas of the barcode 26, it is reflected back towards the barcode sensor 25 differently. The light areas of the barcode reflect more than the dark areas of the barcode. The reflected light is captured and detected by a light detector (e.g., photodiode) in the barcode sensor 25. The light detector converts the reflected light into a scanned-barcode signal. The scanned-barcode signal may be an electronic signal with a modulated amplitude corresponding to the barcode pattern. This modulated signal may be converted into decoded data by a processor 29 (e.g., one or more controller, digital signal processor (DSP), application specific integrated circuit (ASIC), programmable gate array (PGA), and/or programmable logic controller (PLC)) communicatively coupled to the barcode sensor 25.

In another possible embodiment, the barcode sensor 25 includes an image sensor (e.g., CCD, CMOS sensor, etc.) for capturing images of a field of view 27. To scan a barcode 26, the field of view 27 of the imager is positioned to contain the barcode 26 and an image is captured with the image sensor. The processor 29 communicatively coupled to the barcode sensor 25 converts the image of the barcode into decoded data.

The barcode reader 24 also includes a memory 30 (e.g., read-only memory (ROM), flash memory, a hard-drive, etc.) that stores information including a processor-executable software program for security (i.e., security program). The memory 30 may also include a threat-signature library 31 containing known threats (e.g., keywords, templates, code, syntax, etc.). The processor 29 may access the memory 30 to execute the steps of the security program.

The security program configures the processor 29 to receive the barcode information from the barcode sensor 25 as a scanned barcode signal (e.g., modulated analog signal or image). It then converts this scanned-barcode signal into decoded data (e.g., digital data representing the information stored in the barcode). The processor 29 then examines the decoded data and compares it with items in the threat-signature library 31. If the decoded data matches (at last part of) an item in the threat-signature library 31 (or meets some other criteria based on stored data in the library), then the decoded data is identified as a threat. Handling the threat depends on the particular embodiment.

Threats can be deleted or quarantined. Alternatively, the decision on how to handle a threat may be left to a user. In the embodiment in FIG. 1, an input/output (I/O) module 32 (e.g., user interface) may display threat alerts (e.g., visual and/or auditory alerts). Additionally, the I/O module 32 may be configured to prompt the user to classify a threat for an action (e.g., allow, delete, or store).

The subsystems in the barcode reader 24 are electrically connected via a couplers (e.g., wires or fibers) to form an interconnection subsystem 34. The interconnection system 34 may include power buses or lines, data buses, instruction buses, address buses, etc., which allow operation of the modules/subsystems and the interaction there between.

Figure 3:
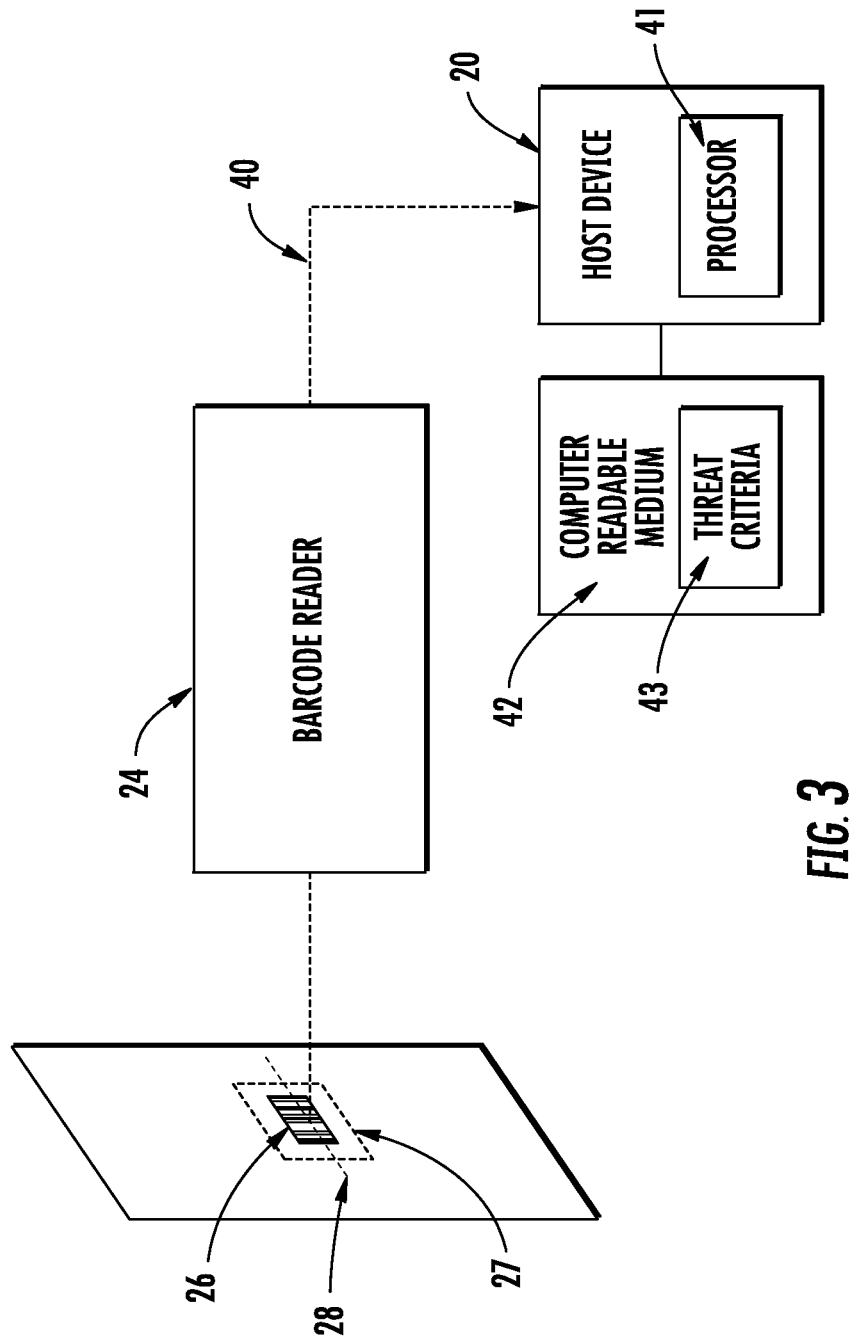
FIG. 3 schematically depicts a block diagram of an exemplary indicia-reading system including a host device running interface software to block data from malicious barcodes.

An exemplary indicia-reading system including a host device running interface software to block malicious data from barcodes is shown in FIG. 3. The barcode reader 24 may include a barcode sensor, a processor, a memory, an input/output module, and a communication module as described previously. The barcode reader 24 is communicatively connected to a host device via a wired or wireless data link 40. This interface may be accessed by a communication module 33 integrated with the barcode reader 24. In a wireless configuration, the communication module may communicate with a host device via a variety of communication protocols (e.g., IEEE 802.11, including WI-FI®, BLUETOOTH®, CDMA, TDMA, or GSM).

The barcode reader 24 is configured to read indicia (e.g., barcodes) and transmit decode data. The host device 20 (e.g., computer, mobile computing device, point of sale terminal, etc.) includes at least one processor 41 running system and/or application software. The processor 41 runs an interface-software program. The interface-software program may operate as an intermediary between the barcode reader 24 and application software and/or operating system software that use the barcode reader 24. The interface-software program configures the processor(s) 41 to block decoded data that meet at least one threat criterion. The blocking prevents the malicious data from altering software, data, or processes running on the host device. The threat criteria 43 are stored on a computer-readable memory 42 (e.g., read-only memory (ROM), flash memory, and/or a hard-drive) local to the host device or connected via a network. The threat criteria may include (but are not limited to) a template that the decoded data format must match; scripts or code that the decoded data must not include; or configuration settings that the decoded data must not include.

Figure 4:
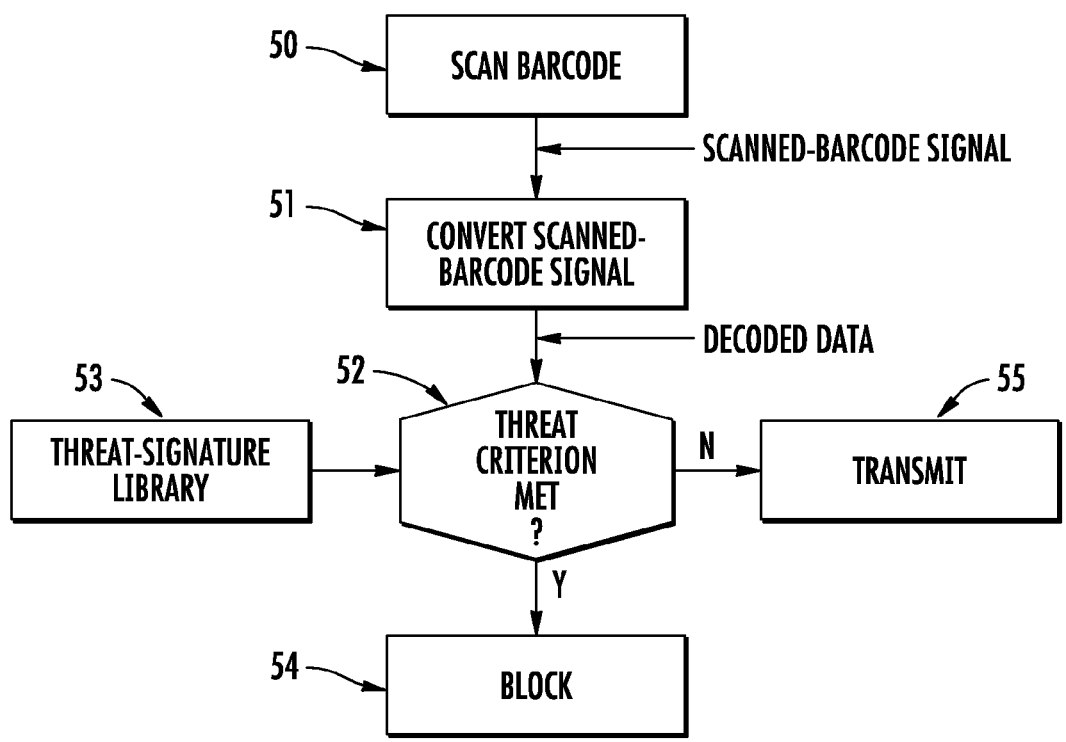
FIG. 4 depicts a flow chart of a method for blocking the transmission of threats from a barcode scanner.

An exemplary method used to block the transmission of threats from a barcode scanner is shown in FIG. 4. The method starts with scanning a barcode 50 to obtain a scanned-barcode signal. The scanned-barcode signal is typically a digital image or a raw electronic signal. The next step in the process is to convert the scanned barcode signal into decoded data 51. The decoded data is typically digital data that represents the information stored in the barcode minus any extraneous information used for barcode decoding. The decoded data is compared 52 to a threat-signature library 53. If a match is obtained or if some other criterion is met, then the barcode information is blocked 54. The blocking may include the malicious data being blocked from transmission to a host device. Alternatively, the malicious data may be blocked from affecting data, processes, or functions linked to the host device. If the comparison 52 finds no correspondence to the threat-signature library, then the decoded data may be transmitted 55 to the host device and allowed to be used by the host device without restriction.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;

U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;

U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing An Elastomeric U-Hinge Based Laser Scanning Assembly, filed Feb. 7, 2012 (Feng et al.);
U.S. Patent Application No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. Patent Application No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. Patent Application No. 29/459,620 for an Electronic Device Enclosure, filed Jul. 2, 2013 (London et al.);
U.S. Patent Application No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. Patent Application No. 29/459,785 for a Scanner and Charging Base, filed Jul. 3, 2013 (Fitch et al.);
U.S. Patent Application No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. Patent Application No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 14/250,923 for Reading Apparatus Having Partial Frame Operating Mode filed Apr. 11, 2014, (Deng et al.);
U.S. patent application Ser. No. 14/257,174 for Imaging Terminal Having Data Compression filed Apr. 21, 2014, (Barber et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/274,858 for Mobile Printer with Optional Battery Accessory filed May 12, 2014 (Marty et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILEPHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Reublinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEBBASED SCAN-TASK ENABLED SYSTEM AND METHOD OF AND APPARATUS FOR DEVELOPING AND DEPLOYING THE SAME ON A CLIENTSERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTON CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. Patent Application No. 29/486,759 for an Imaging Terminal, filed Apr. 2, 2014 (Oberpriller et al.);

U.S. Patent Application No. 29/492,903 for an INDICIA SCANNER, filed Jun. 4, 2014 (Zhou et al.); and U.S. Patent Application No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A barcode reader, comprising:
   a barcode sensor for capturing barcode information;
   a memory for storing a security program;
   a processor communicatively coupled to the barcode sensor and the memory, the processor configured by the security program to: (i) receive the barcode information, (ii) convert the barcode information into decoded data, (iii) compare the decoded data with a threat-signature library stored in the memory, (iv) identify the decoded data as a threat if the decoded data matches, at least part of, an item in the threat-signature library.

2. The barcode reader according to claim 1, wherein the processor is further configured by the security program to prevent the threat from being transmitted from the barcode reader.

3. The barcode reader according to claim 2, wherein the threat is deleted from the memory.

4. The barcode reader according to claim 2, wherein the threat is stored in the memory.

5. The barcode reader according to claim 1, wherein the barcode sensor comprises a laser scanner for scanning a laser across a field of view.

6. The barcode reader according to claim 1, wherein the barcode sensor comprises an imaging system for capturing images of a field of view.

7. The barcode reader according to claim 1 comprising an input/output (I/O) module for (i) receiving information from a user and (ii) transmitting information to the user.

8. The barcode reader according to claim 7, wherein the security program further configures the processor to (i) generate an alert when a threat has been detected and (ii) transmit the alert to the input/output module.

9. The barcode reader according to claim 8, wherein the alert comprises an audible sound.

10. The barcode reader according to claim 8, wherein the alert comprises a visual indication.

11. The barcode reader according to claim 8, wherein the alert comprises a prompt requesting a user to accept or reject the threat.

12. The barcode reader according to claim 1, wherein an item in the threat-signature library comprises information indicative of a buffer overflow.

13. The barcode reader according to claim 1, wherein an item in the threat-signature library comprises information indicative of code injection.

14. An indicia-reading system, comprising:
- an barcode reader for reading indicia and transmitting decoded data;
- a host device communicatively coupled to the barcode reader via a data link, wherein
- the host device has at least one processor configured by an interface-software program to block decoded data that meet at least one threat criterion from effecting the host device,
- wherein the at least one threat criterion is stored on a computer-readable medium communicatively coupled to the host device and accessible to the interface-software program.

15. The indicia-reading system according to claim 14, wherein the at least one threat criterion comprises a template that the decoded data format must match.

16. The indicia-reading system according to claim 14, wherein the at least one threat criterion comprises scripts or code that the decoded data must not include.

17. The indicia-reading system according to claim 14, wherein the at least one threat criterion comprises configuration settings that the decoded data must not include.

18. The indicia-reading system according to claim 14, wherein the barcode reader is a handheld barcode scanner.

19. The indicia-reading system according to claim 14, wherein the computing device comprises a point of sale system.

20. A method for blocking the transmission of threats from a barcode reader, the method comprising:
- scanning a barcode to obtain a scanned-barcode signal;
- converting the scanned-barcode signal into decoded data;
- comparing the decoded data with items in a threat-signature library;
- identifying the decoded data as a threat if the decoded data matches, at least part of, an item in the threat-signature library; and
- blocking the threat from being transmitted from the barcode scanner.

21. The method according to claim 20, comprising the step of prompting a user to confirm that the decoded data is a threat before blocking the threat from transmission.

\* \* \* \* \*